United States Patent
Dalton et al.

(10) Patent No.: US 11,424,922 B2
(45) Date of Patent: Aug. 23, 2022

(54) HASHING SCHEMES FOR CRYPTOGRAPHIC PRIVATE KEY GENERATION

(71) Applicant: PayPal, Inc., San Jose, CA (US)

(72) Inventors: Charles Gabriel Neale Dalton, San Jose, CA (US); Suryatej Gundavelli, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 258 days.

(21) Appl. No.: 16/874,271

(22) Filed: May 14, 2020

(65) Prior Publication Data

US 2021/0359853 A1 Nov. 18, 2021

(51) Int. Cl.
*H04L 9/08* (2006.01)
*G06F 9/451* (2018.01)
*H04L 9/06* (2006.01)

(52) U.S. Cl.
CPC ............ *H04L 9/0869* (2013.01); *G06F 9/451* (2018.02); *H04L 9/0643* (2013.01)

(58) Field of Classification Search
CPC ... H04L 9/0869; H04L 9/0643; H04L 9/3247; H04L 9/08; H04L 9/30; H04L 9/22; H04L 9/18; H04L 9/06; G06F 9/451
USPC .......................................................... 380/44
See application file for complete search history.

(56) References Cited

U.S. PATENT DOCUMENTS

| | | | | |
|---|---|---|---|---|
| 5,692,177 A * | 11/1997 | Miller | ................. | G06F 16/9014 |
| 6,125,185 A * | 9/2000 | Boesch | ................. | H04L 9/0825 |
| | | | | 713/170 |
| 7,853,529 B1 * | 12/2010 | Walker | ................. | G06Q 20/206 |
| | | | | 705/55 |
| 8,918,635 B2 * | 12/2014 | Kim | ........................ | H04L 9/088 |
| | | | | 713/153 |
| 2006/0059344 A1 * | 3/2006 | Mononen | .............. | H04L 9/0891 |
| | | | | 713/171 |
| 2009/0262925 A1 * | 10/2009 | Vijayarangan | ........ | H04L 9/0643 |
| | | | | 380/29 |
| 2014/0129830 A1 * | 5/2014 | Raudaschl | .......... | G06F 21/6218 |
| | | | | 713/165 |

(Continued)

OTHER PUBLICATIONS

Ted G.Lewis "Hashing for Dynamic and Static Internal Tables" IEEE pp. 45-56; Oct. 1988 (Year: 1988).*

*Primary Examiner* — Sanchit K Sarker
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to generation of cryptographic private keys. In some embodiments, a computing system receives a request for a private key for use with a service that uses a key of a first length, where the request specifies a key of a second length that is less than the first length. The system then generates a hashing scheme based on the second length and a key computation time, where the hashing scheme includes a number of hashing rounds and a set of hashing functions. The system creates a synthetic key of the second length and uses the synthetic key and the hashing scheme to create a normal key of the first length, where the synthetic key permits a user to access the service by supplying the synthetic key and without having to supply the normal key. The disclosed cryptographic techniques may advantageously allow for memorization of private keys.

20 Claims, 8 Drawing Sheets

(56) References Cited

U.S. PATENT DOCUMENTS

| | | |
|---|---|---|
| 2016/0005039 A1 | 1/2016 | Taveau et al. |
| 2016/0112200 A1* | 4/2016 | Kheterpal ............. H04L 9/0643 380/28 |
| 2017/0286717 A1* | 10/2017 | Khi ........................ H04L 63/12 |
| 2017/0344435 A1* | 11/2017 | Davis .................. G06F 16/2365 |
| 2017/0344987 A1* | 11/2017 | Davis ...................... H04L 63/06 |
| 2020/0412544 A1* | 12/2020 | Kheterpal ............. H04L 9/0643 |

\* cited by examiner

Receive a request for a cryptographic private key for use with a service that uses a key of a first length, where the request specifies a key of a second length that is less than the first length.
710

Generate, in response to the request, a hashing scheme, wherein the hashing scheme is generated based on the second length and a key computation time, where the generated hashing scheme includes: a determined number of hashing rounds and a selected set of hashing functions.
720

Create a synthetic key of the second length.
730

Use the synthetic key and the hashing scheme to create a normal key of the first length, where the synthetic key permits a user to access the service by supplying the synthetic key and without having to supply the normal key.
740

Fig. 7

HASHING SCHEMES FOR CRYPTOGRAPHIC PRIVATE KEY GENERATION

BACKGROUND

Technical Field

This disclosure relates generally to computer security, and, more specifically, to techniques for generating cryptographic private keys, e.g., for transaction security.

Description of the Related Art

Cryptographic private keys are often used by different systems to exchange secure messages. For example, a first user may encrypt or "sign" a message using their cryptographic private key before providing this message to another user. In this situation, only the first user knows their private key, but the other user is able to verify that the signed message originated from the first user. Users are often required to remember their private key in order to prove their identity by signing messages when communicating with other users. For example, a user may memorize or otherwise store their private key when a cryptographic system provides them with their private key for the first time. In order to maintain the integrity of a user's private key, cryptographic systems often generate long private keys which are difficult for users to memorize. In other words, a cryptographic system may generate private keys that have a very large key space in order to prohibit malicious users from using brute-force methods to guess the user's private key.

BRIEF DESCRIPTION OF THE DRAWINGS

FIG. 7 is a flow diagram illustrating a method for generating a synthetic cryptographic private key for use with a service that uses a normal cryptographic private key that is longer than the synthetic key, according to some embodiments.

Figure 1:
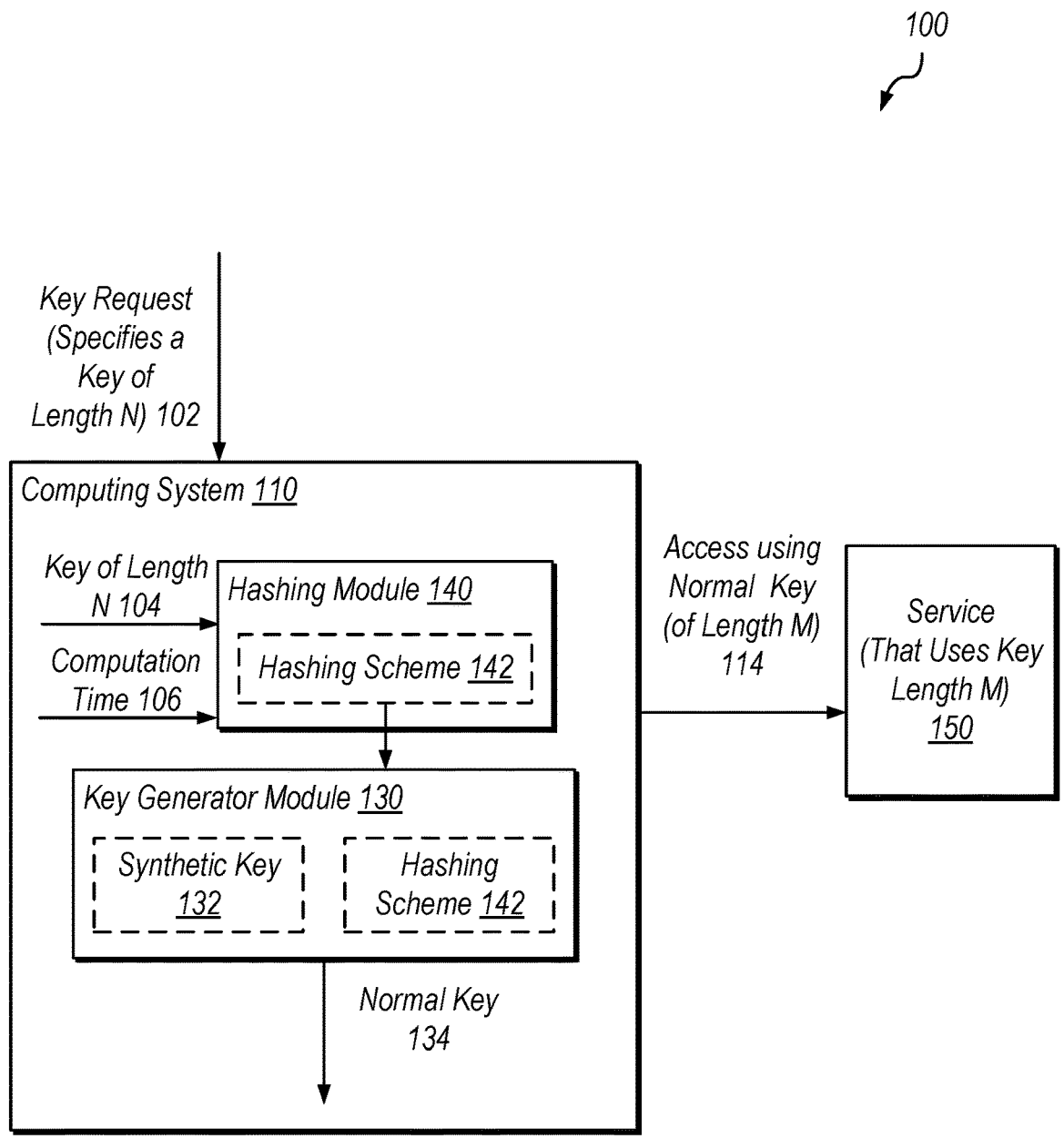
FIG. 1 is a block diagram illustrating an example computing system configured to generate a synthetic key of key length N that is shorter than a normal key of key length M, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computing system configured to generate a synthetic cryptographic private key" is intended to cover, for example, a computer system that performs this function during operation, even if it is not currently being used (e.g., when its power supply is not connected). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example.

When the term "or" is used in this disclosure with respect to a list of options, it will generally be understood to be used in the exclusive sense unless the context provides otherwise. Thus, a recitation of "x or y" is equivalent to "either x or y, but not both." On the other hand, a recitation such as "x or y, or both" is to be interpreted in the inclusive sense. A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, a "module" refers to software and/or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as operable to perform operations refers to both a software and a hardware module.

DETAILED DESCRIPTION

In order to provide sufficient security, cryptographic systems have commonly utilized relatively long cryptographic private keys. Generally, private keys that include a larger number of elements (e.g., characters or numbers, or both) are considered more secure than private keys with a smaller number of elements. Thus, in order to prohibit others from guessing a given user's private key, a cryptographic system generates a very long key. This, however, may places a burden on the user in that they must either memorize or otherwise store (e.g., on their device or as a hardcopy, such as a piece of paper) their private key for later use after it is generated by a cryptographic system. In situations where users store their private keys, this may introduce more opportunities for their keys to be accessed by unauthorized users.

In general, long private keys are associated with a large key space. As used herein, the term "key space" is intended to be construed according to its well-understood meaning, which includes a set of all possible permutations of a given key. For example, a key that is one character long and is generated from a set of six characters has a key space of 6. In the field of cryptocurrency, private keys may be chosen from a given field of values. For example, BITCOIN private keys are 32 bytes (64 hexadecimal characters) long, resulting in a key space that is $2^{256}$. A key space with these dimensions makes it very difficult for an attacker to check every possible value within the key space in order to access a user's account. For example, according to one estimate, it might take more than a trillion U.S. dollars in hardware cost for an attacker to have a reasonable chance of guessing another user's private key in a year, given a key space of $2^{256}$.

Cryptographic private keys that are 32 bytes long, however, are nearly impossible for most users to remember. Thus, many users may manually record their private keys on a piece of paper or store their private keys on their computer. Both of these scenarios present opportunities for other, unauthorized users to obtain these private keys. For example, consider a situation where a computing system provides a user with a private key that is 64 characters (32 bytes) long. In this example, the user will likely be unable to memorize the private key and will, therefore, need to write down their key or store the key digitally on their device. The present inventors have recognized that if instead, the user were presented with a private key that was 8 characters (4 bytes) long, it would be more likely that they would be able to memorize the 8-character private key for later use in secure transactions. This may prevent other users from obtaining the private key because the key is not written down where it could be seen or is not stored on a device that could be hacked. The disclosed techniques may advantageously provide users with secure private keys that are short enough for these users to remember for later use without having to externally store the private key. These private keys also take less time for the user to enter.

Techniques are disclosed for providing users with "synthetic" keys to users that can be translated to longer "normal" keys (e.g., 10 characters versus 32 characters). For example, a synthetic key may be generated from a synthetic field that includes a set of characters, while a normal key may be generated from a normal field that includes a different, larger set of characters. A field may include, for example, a set of elements, such as integers (e.g., {0, 1, 2, 3}) or binary digits (e.g., {00, 01, 10, 11}).

This synthetic-to-normal key translation process may be advantageously used by a software program that acts as an interface between the user and a service (e.g., BITCOIN). Such a program may allow a user to enter a key of length N, translate the key to length M (where M>N), and provide the key of length M to the service, with the result that the user only has to remember the shorter key of length N because the longer key of length M may be derived from the shorter key. In various embodiments, the program may be a cryptographic application stored on a user device, and in some cases may be part of a payment application that facilitates payment transactions such as those that utilize a service such as BITCOIN. During a first user interaction with the disclosed system and prior to the user receiving a private key, the program may generate a synthetic key and map this synthetic key to a longer, normal key using a hashing scheme that includes a particular number of hashing rounds and a determined set of hashing functions. Once the computing system has generated the synthetic key, it provides this short key to a user of the user device for use in securely transmitting messages to a service. This short key is ideally of a length that makes it easier for a user to remember it and, therefore, advantageously removes or lessens the need for the user to record or store the shorter key.

The disclosed techniques are not simply a matter of replacing a longer key with a shorter key. The present inventors have recognized that by properly selecting the hashing scheme which is used to map the synthetic key to the normal key, the security of the service will not be compromised. Consider an example in which a payment application is used that permits a user to enter an 8-character synthetic key that is mapped to a 32-character normal key that is used to access BITCOIN. Now consider the amount of computation time it would take for an attacker to perform a brute force entry into the BITCOIN key space. In the proposed technique, an attacker would not only have to try a brute-force entry into the smaller synthetic key space, but would have to perform the hashing scheme in order to translate the synthetic key to a normal key that would be recognized by BITCOIN. If the hashing scheme is selected to be sufficiently computationally intensive, the amount of computation time for brute force entry would remain the same. Thus, the service (here BITCOIN) and its users remain as secure as before, but the key required to provide at least the same level of security can be shorter because some of the "burden" of the security can be undertaken by the hashing scheme.

These techniques may be used to access the service in various ways. As one specific example, a user may wish to complete a BITCOIN transaction and send a transaction request to a BITCOIN server via their digital wallet. Prior to sending the transaction request, the user enters their synthetic key and the computing system maps this synthetic key to the normal key and then signs the request using the normal key. This signed transaction request is then transmitted to the server for authorization. Note that access to BITCOIN is just one possible example of a service that might be accessed using these techniques; the service may be of any arbitrary functionality, including financial or non-financial applications. For example, private keys may be used in contract management software or software distribution. In the contract management context, a legal service may sign a legal contract using their private key for security and then transmit this contract to one of their clients. The client is able to authenticate the source of the legal contract by decrypting the signed legal contract using a public key of the legal service.

Example Synthetic Key Generation

FIG. 1 is a block diagram illustrating an example computing system configured to generate a synthetic key of key length N that is shorter than a normal key of key length M. In the illustrated embodiment, system 100 includes a computing system 110 configured to access a service 150 that uses cryptographic keys of a key length M. In some embodiments, computing system 110 is a user device as discussed in detail with reference to FIGS. 3A and 3B. In other embodiments, computing system 110 is a server as discussed in detail with reference to FIGS. 4A and 4B.

Figure 6:
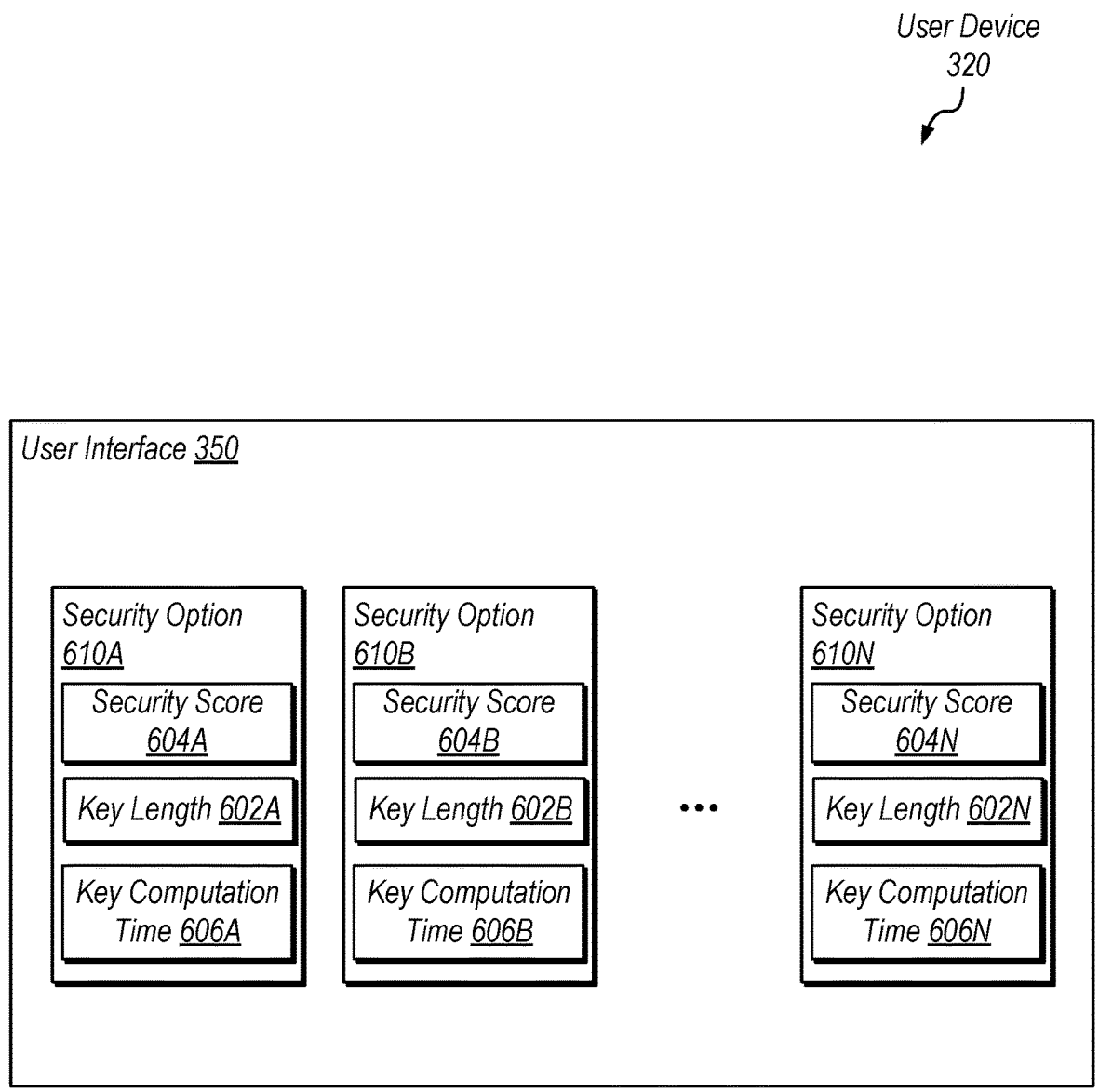
FIG. 6 is a block diagram illustrating example security options displayed via a user interface, according to some embodiments.

Computing system 110, in the illustrated embodiment, receives a key request 102 from a user requesting a key that is a key length N that is shorter than key length M. A user may specify an arbitrary key length or may select a particular key length from a predetermined set of key lengths provided by computing system 110. FIG. 6 shows examples of input that may be provided by the user when sending key request 102 to computing system 110 for a private key. Once a user has specified a key length in their request, computing system 110 is configured to generate a key corresponding to the specified length. (Herein, "key length" may be measured in any suitable units—e.g., characters, bits, bytes, etc.) For example, a user may request a cryptographic private key that is 8 characters long. Based on the key length specified in key request 102, computing system 110 generates a synthetic key 132 and maps the synthetic key to a normal key 134 that is a key length M. Key length M is longer than key length N. That is, the normal key includes more elements (e.g., characters) than the synthetic key. Example synthetic and normal keys are shown in FIG. 2.

In some embodiments, prior to generating synthetic key 132, computing system 110 is configured to identify whether the key length N specified in key request 102 satisfies a key length threshold. For example, computing system may reject key request 102 if the key length does not satisfy the threshold (e.g., is too short). That is, if a key is short, its key space may be small and, therefore, this short key may be easily guessed using brute-force determination techniques. Such a short key would not satisfy the key length threshold. The key length threshold may be predetermined based on key spaces associated with different key lengths.

Computing system 110 is then configured to provide the synthetic key 132 to a user who sent key request 102. For example, computing system 110 may display synthetic key 132 via a user interface in a one-time display for memorization by the user. In other situations, computing system 110 may store the synthetic key 132 and supply the synthetic key to the user at a later time upon request from the user or during a key recovery process (e.g., if the user broke their phone and replaced their phone with a new one). For example, if a user were to forget their synthetic key, the computing system could provide the synthetic key in response to the user answering a set of recovery questions. In some embodiments, computing system 110 may further be configured to register normal key 134 with service 150 (e.g., a cryptocurrency server, a bank server, a third-party financial server, a web server, a person-to-person communication system, an employee authentication system, etc.). For example, in some situations, in order for the synthetic key to be used to request transactions, the normal key needs to be registered with the transaction service. In other situations, service 150 may be a transaction ledger that facilitates transaction requests that are signed using normal keys that do not need to be registered prior to use.

In some embodiments, after providing a user with synthetic key 132, computing system 110 receives a message request from a user, that includes a synthetic key, to send a private message to service 150. Based on such a request, computing system 110 is configured to derive a normal key from the synthetic key by hashing the synthetic key included in the request using hashing scheme 142. Once it has derived a normal key from the provided synthetic key, computing system 110 is configured to use normal key 134 to perform access 114 of service 150. For example, computing system 110 may be configured to sign the requested message using normal key 134 and transmit this message to service 150.

Service 150 is then configured to authenticate the message based on the signature using the normal key 134. As one specific example, access 114 may include a signed transaction request. In this example, service 150 may determine whether to authorize the requested transaction by verifying the authenticity of the computing system 110 requesting the transaction. This verification is performed based on the transaction request being signed with the correct normal key 134, which in turn was generated based on the correct synthetic key 132 using the correct hashing scheme 142.

As used herein, the term "hashing" is intended to be construed according to its well-understood meaning, which includes using a mathematical algorithm to convert an input value of arbitrary size into a different value of fixed size. For example, a hash function may be a mathematical algorithm that takes a private key having a first length as input and outputs a different key having a second, different length. In various embodiments described in the present disclosure, a hashing scheme made up of one or more hashing operations may result in an input key within a first key space being mapped to an output key within a second, larger key space. Hashing functions are often one-way hashing algorithms whose output hash values cannot be converted back into the original input. For example, a hash function, denoted $H(x)$, takes in an input x and outputs a deterministic scrambled response. This means if $H(1)$ returns the value 5249, it will always return 5249. In addition, because $H(x)$ is a one-way hash function, it is not possible to take the value 5249 and figure out that the value 1 was used to generate it. The following are non-limiting examples of hashing functions: Scrypt, MD5, SHA256, SHA512, CRC-32, Shake-128, etc. Hashing rounds refer to iterations of hashing. In some situations, performing a single hashing round may include a single iteration of hashing a private key (or some other piece of information) using a particular hashing function. For example, each round of three rounds of hashing performed on a particular synthetic key may be performed using a different hashing function. As one specific example, a synthetic key may be hashed using the following formula: SHA256(MD5(Keccak256(synthetic key))). In other situations, all three rounds of hashing may be performed using the same hashing function. For example, a synthetic key may be hashed using the following formula: SHA256 (SHA256(SHA256(synthetic key))).

In some embodiments, computing system 110 is a server computing system configured to receive key requests 120 from user devices. For example, computing system 110 may be a cryptographic server that is configured to process requests for private keys received from users via cryptographic applications downloaded on user devices. In other embodiments, computing system 110 is a user device configured to receive key requests 102 from users. In such embodiments, computing system 110 may include a cryptographic application downloaded and executable by the computing system to allow a user to request private keys and then use these private keys to sign messages for authentication.

Computing system 110 includes a hashing module 140 and a key generator module 130. Hashing module 140 is operable by computing system 110 to generate a hashing scheme 142. Hashing module 140 receives information specifying a key length N 104 and computation time 106 as inputs and provides a hashing scheme 142 to key generator module 130. In some embodiments, computation time 106 is specified in key request 102 in addition to key length N 104. Computation time 106 may specify a length of time which computing system 110 may spend generating a key (and mapping it to a normal key) based on key request 102. For example, key length N 104 may be 10 characters long, while the computation time 106 to generate the requested key may be one hour. Based on this information, hashing module 140 determines a number of hashing rounds to perform on a synthetic key as well as a set of one or more hashing functions usable to perform the determined number of hashing rounds. Example hashing schemes are discuss in further detail below with reference to FIG. 5.

As used herein, the term "computation time" refers to an amount of time it will take a computing system having some known set of hardware and software resources to derive a normal key from a synthetic key of a given length using a given hashing scheme. Derivation of normal keys from short synthetic keys, for example, may require a longer computation time than from long synthetic keys with all else, including security, being equal. The computation time may be inversely related to the total computing resources available to the computing system. For example, a computing system that has a smaller amount of computing resources may have a longer computation time than another computing system with a larger amount of computing resources when both computing systems are deriving a normal key of the same length using the same hashing scheme. In addition to key length and computing resources, a hashing scheme may affect key computation time. That is, a hashing scheme that includes a large number of hashing rounds may require a longer key computation time than a hashing scheme with a small number of hashing rounds.

Key generator module 130 generates a synthetic key 132 and maps this synthetic key to a normal key 134 using hashing scheme 142. For example, key generator module 130 may generate synthetic key 132 using random or near-random techniques. Key generator module 130 may generate synthetic key 132 by randomly selecting characters (e.g., letters, number, symbols, etc.) from a set of characters included in a synthetic field (see example synthetic field shown in FIG. 2). For example, synthetic key 132 may be generated by randomly selecting 8 characters from a set that includes letters A-F and numbers 0-9. Key generator module 130 then maps synthetic key 132 to normal key 134 using hashing scheme 142. An example mapping is discussed below with reference to FIG. 2.

As used herein, the term "cryptographic private key" is intended to be construed according to its well-understood meaning, which includes a variable in the field of cryptography that is used in combination with an algorithm to sign or decrypt information, or both. Private keys are shared only with a single, authorized user at generation to maintain the security of the key. This single user may prove that they are who they say they are by "signing" information using their private key. A private key may also be referred to as a secret key. Cryptographic private keys may be different lengths and may be generated from different sets of characters. For example, a "synthetic key" may be a shorter private key that includes 12 characters and is generated from a first set of characters, while a "normal key" may be a longer private key that includes 64 characters and is generated from a second, different set of characters. The first set of characters may make up a synthetic field, while the second set of characters may make up a normal field, as discussed below with reference to FIG. 2B.

Example Fields and Private Keys

Figure 2A:
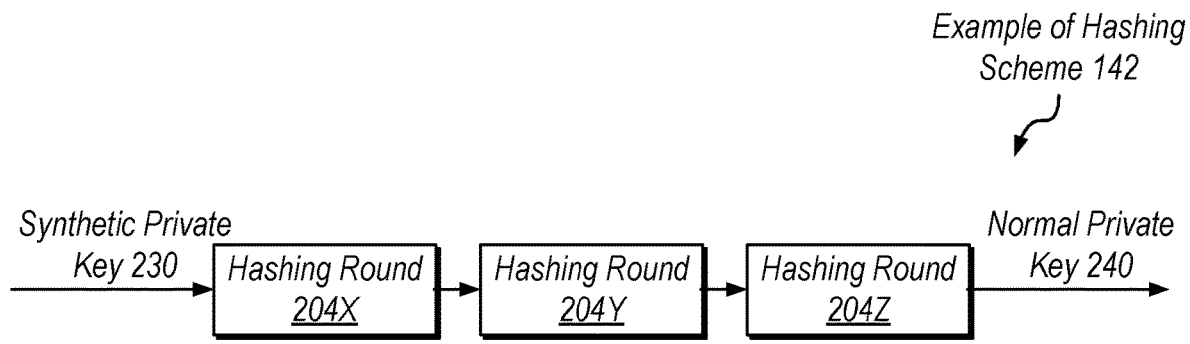
FIGS. 2A and 2B are diagrams illustrating an example hashing scheme and application of the example hashing scheme to map a synthetic field to a normal field, respectively, according to some embodiments.
Figure 2B:
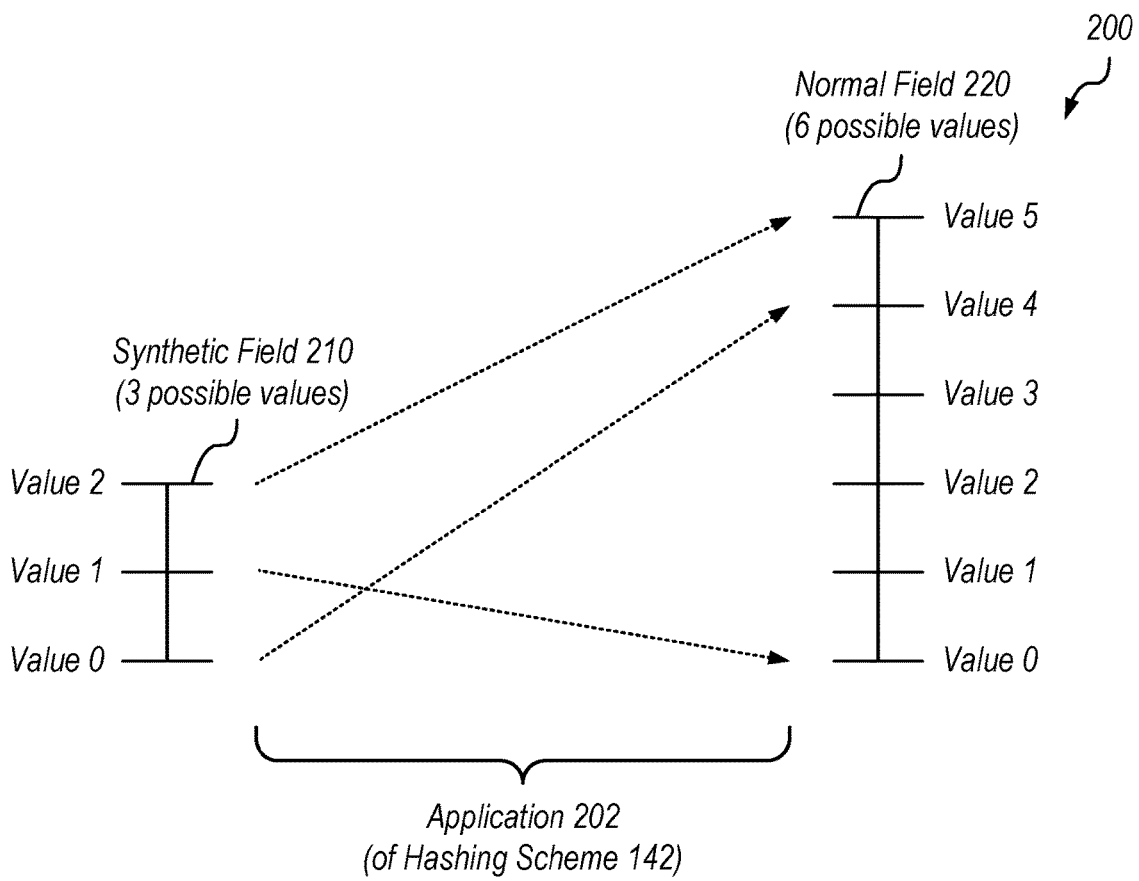

FIGS. 2A and 2B are diagrams illustrating an example hashing scheme 142 and application of the example hashing scheme to map a synthetic field to a normal field, respectively. In FIG. 2B, example 200 illustrates application of example hashing scheme 142 to synthetic keys included in a synthetic field 210.

In FIG. 2A, hashing scheme 142 is applied to synthetic private key 230. For example, three different hashing rounds 204 are performed on the synthetic key to generate normal private key 240. Hashing rounds 204X, 204Y, and 204Z may be performed using the same or different hashing functions. In addition, in other embodiments, more (or less) than three hashing rounds may be performed on synthetic key 230. Note that the hashing scheme shown in FIG. 2A is one non-limiting example of hashing scheme 142, and that other steps or operations may be performed as part of the scheme. For example, the hashing scheme shown in the illustrated embodiment may include feedback and/or feedforward operations between the three hashing rounds.

In FIG. 2B, synthetic field 210 includes a set of three possible synthetic key values: {0, 1, 2}, while normal field 220 includes a set of six possible normal key values {0, 1, 2, 3, 4, 5}. The dotted arrows in the illustrated embodiment represent the application 202 of hashing scheme 142 in mapping synthetic keys of synthetic field 210 to normal keys of normal field 220. The fields shown in FIG. 2B illustrate two non-limiting example sets of keys (synthetic and normal). In other embodiments, fields may include private keys with values other than integers (e.g., letters, symbols, etc.). Note that the synthetic and normal key values shown in FIG.

2B are non-limiting examples of private keys and that private keys may be much longer (include more than one character).

In the illustrated example, for each synthetic key in synthetic field 210, computing system 110 may determine a corresponding normal key of normal field 220 by inputting each key value into a hashing function H(x). As shown in the illustrated embodiment, H(0)=4, H(1)=0, and H(2)=5, so the synthetic field keys 0, 1, and 2, are mapped to the normal field keys 4, 0, and 5. Note that the embodiment shown in FIG. 2B is one non-limiting example of derivation of normal keys from synthetic keys. That is, the mapping between normal keys and private keys may be a 2-digit (or three, five, ten, etc. -digit) to 1-digit mapping. For example, in other situations, a normal key derived from a synthetic key may be three, five, ten, etc. times longer than a synthetic key. In some situations, a synthetic key may include only numbers while its corresponding normal key may include both letters and numbers.

Given the mapping shown in FIG. 2B, suppose that computing system 110 provides a synthetic key to a user Alice, where this synthetic key includes a single value (a key of length 1) in synthetic field 210. Now, in this example, Alice's synthetic key maps to a corresponding element in normal field 220. Given this example scenario, another user (e.g., an attacker) Eve can guess Alice's private key using two different methods. The first method is a traditional method in which Eve may disregard the synthetic field entirely and guess every integer in the normal field 220 (0 to 5), resulting in six different guesses. The second is a new method in which Eve may apply the hashing scheme to all of the elements in the synthetic field 210 (0, 1, and 2) to obtain the corresponding elements of the normal field 220 (4, 0, and 5) and guess these normal field values, resulting in three guesses. In both scenarios, Eve must complete six steps in order to brute-force guess Alice's private key. In some situations, Alice's synthetic key is mapped to a normal key using three hashing rounds, which may advantageously increase the security of Alice's synthetic key. In this example situation, Eve would need to complete 12 steps (9 hashing rounds (three rounds for each of the three potential key)+3 guesses) to determine Alice's private key.

In situations where a single hashing round is performed to map synthetic field values to normal field values, the amount of work to brute-force guess Alice's private using the traditional method is not equal to the amount of work to brute-force guess Alice's private key using the new method. That is, the work to compute a hash of a value is often cheaper than simply brute-force guessing a value. Therefore, the disclosed techniques use multiple hashing rounds to map values of synthetic field 210 to values of normal field 220. For example, computing system 110 may use a hashing scheme H(H( . . . H(x) . . . ) to map values of synthetic field 210 to values of normal field 220, where each H(x) applied to a synthetic field value is one hashing round.

Computing system 110 may apply n rounds of hashing, with the work of performing n hashing rounds being equal to or greater than the work of brute-force guessing, where n may be any real number. Said another way, if computing system 110 uses a hashing scheme 142 that includes n hashing rounds to map Alice's synthetic field value to a normal field value, then Eve will have to perform the same or a greater amount work to brute-force guess Alice's key using the new method than the amount of work to brute-force guess Alice's key using the traditional method.

In this non-limiting example, computing system 110 has advantageously reduced the complexity of Alice's data element (e.g., a value within a smaller field of values) without decreasing the difficulty to brute force guess her private key. Now, Alice only has to remember a number from 0 to 2, while Eve has to guess numbers from 0 to 5. Therefore, the disclosed techniques may advantageously provide a user with a shorter, remememberable private key, without compromising the security of the private key (e.g., without reducing the difficulty of guessing the private key using brute-force techniques).

Example Cryptographic Application

Figure 3A:
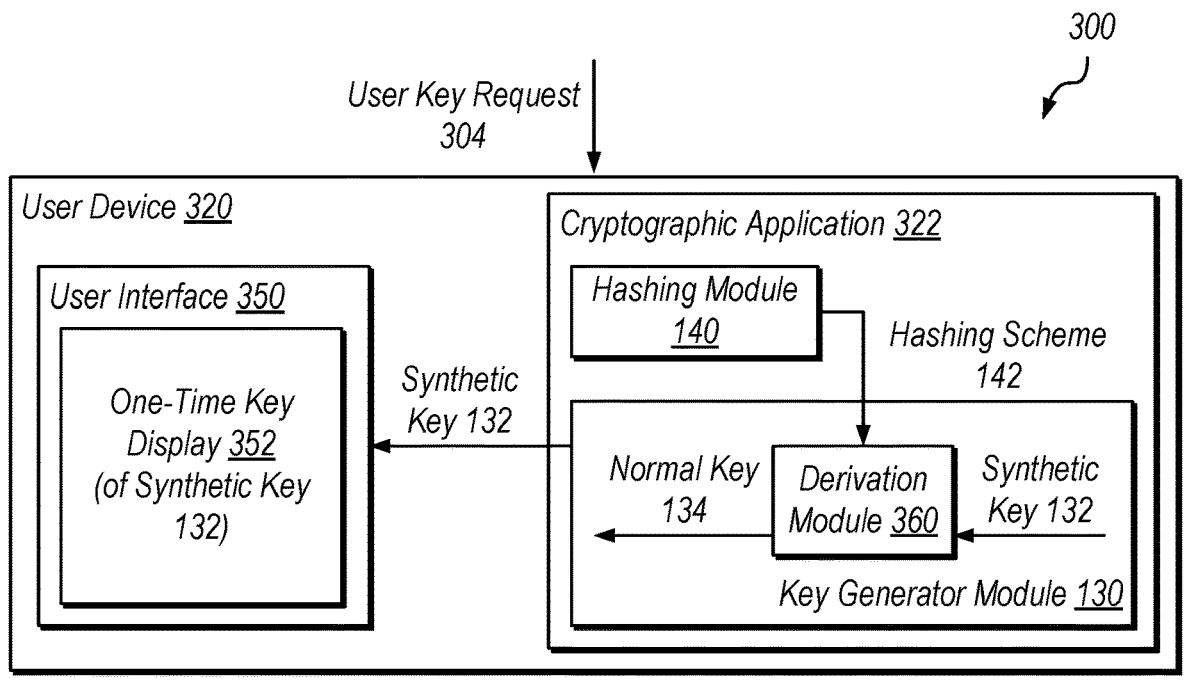
FIGS. 3A & 3B are block diagrams illustrating example generation of a synthetic key and use of the generated synthetic key, respectively, by a user device, according to some embodiments.
Figure 3B:
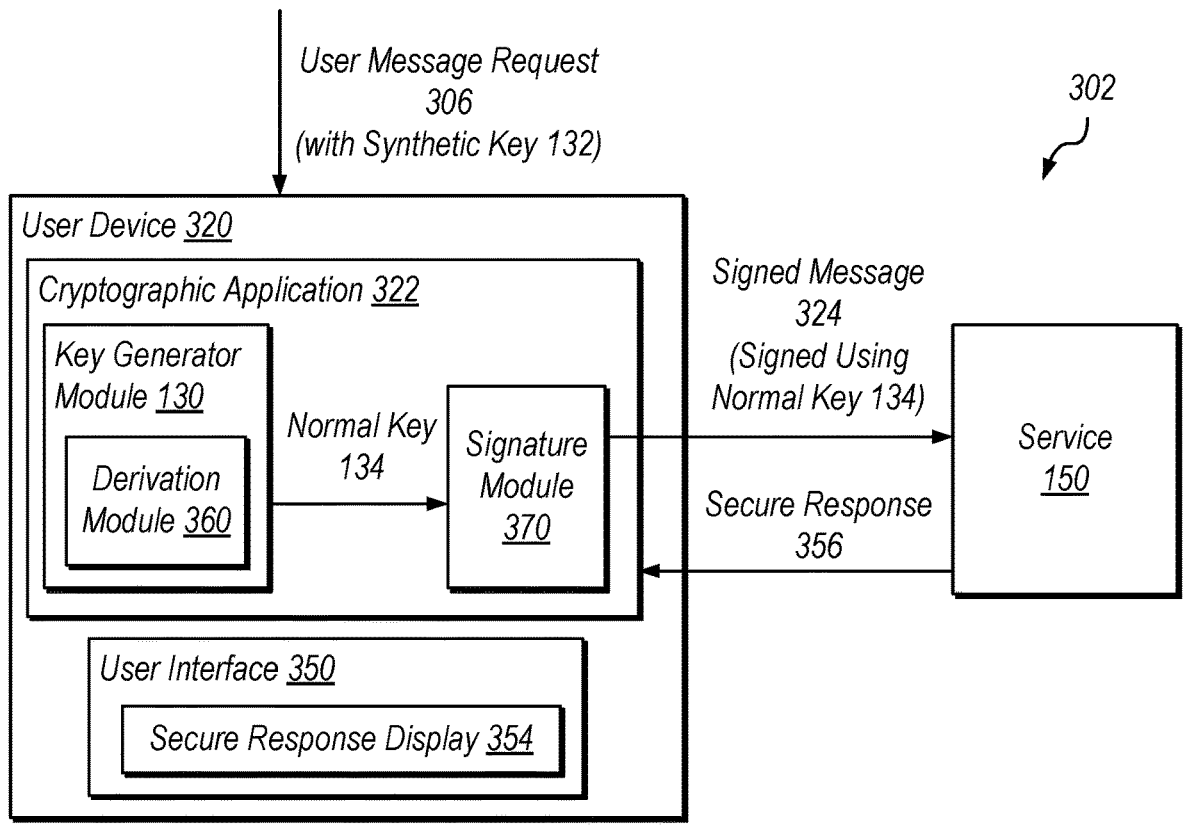

FIGS. 3A & 3B are block diagrams illustrating example generation of a synthetic key and use of the generated synthetic key, respectively, by a user device 320. In FIG. 3A, system 300 includes a user device 320, while in FIG. 3B system 302 includes user device 320 and service 150. Note that user device 320 is one example of computing system 110.

In FIG. 3A, user device 320 includes a cryptographic application 322 and a user interface 350. Cryptographic application 322 may be a digital wallet application downloaded on a user's cell phone, for example. User device 320, in the illustrated embodiment, receives a user key request 304 for a synthetic key. Based on this request, cryptographic application 322 generates synthetic key 132 using key generator module 130 and executes hashing module 140 to generate hashing scheme 142 for deriving a normal key 134 from synthetic key 132. Key generator module 130 includes a derivation module 360 that uses hashing scheme 142 to map synthetic key 132 to normal key 134. Cryptographic application 322 sends synthetic key 132 to user interface 350 for display in a one-time key display 352 for memorization by the user of user device 320. In this example embodiment, synthetic key 132 is only displayed once and is not stored for later use.

In FIG. 3B, user device 320 receives a user message request 306 that includes a synthetic key 132. In some embodiments, user message request 306 is a request to authorize a transaction between user device 320 and service 150. For example, a user may send a request to initiate a transaction via a BITCOIN server. User device 320 is configured to execute cryptographic application 322 to derive a normal key from the synthetic key 132 provided in request 306 using derivation module 360. For example, derivation module may utilize hashing scheme 142, generated by hashing module 140 (not shown in FIG. 3B), to derive normal key 134. Key generator module 130 then provides normal key 134 to signature module 370.

Signature module 370 uses normal key 134 to sign (encrypt) the message requested by the user of user device 320 and transmits this signed messaged 324 to service 150. Service 150 then verifies the authenticity of user device 320 by decrypting signed message 324 using a public key corresponding to normal key 134. If signed message 324 is signed using a normal key that is derived from the correct synthetic key, then service 150 will know that the user of user device 320 is authentic (e.g., they are who they say they are). If, however, the synthetic key supplied in request 306 is incorrect, then the result of decrypting signed message 324 will indicate that the user of user device 320 is not authentic. Based on decrypting signed message 324, service 150 sends a secure response 356 to cryptographic application 322.

User interface 350 provides a display 354 of secure response 356 to the user of user device. In some embodiments, secure response 356 indicates that a transaction requested by the user has been approved based on service 150 being able to authenticate the user. In other embodiments, secure response 356 indicates that the transaction has been declined.

Note that various examples herein are discussed in the context of transactions, but these examples are discussed for purposes of explanation and are not intended to limit the scope of the present disclosure. In other embodiments, any of various secure transmissions may be implemented between a computing system and a service using private keys.

In contrast to the embodiments illustrated in FIGS. 3A and 3B, key generation and hashing operations may be performed by a cryptographic server rather than an application (such as cryptographic application 322) downloaded on user device 320. That is, a cryptographic server may facilitate secure communication between user device 320 and service 150.

Example Cryptographic Server

Figure 4A:
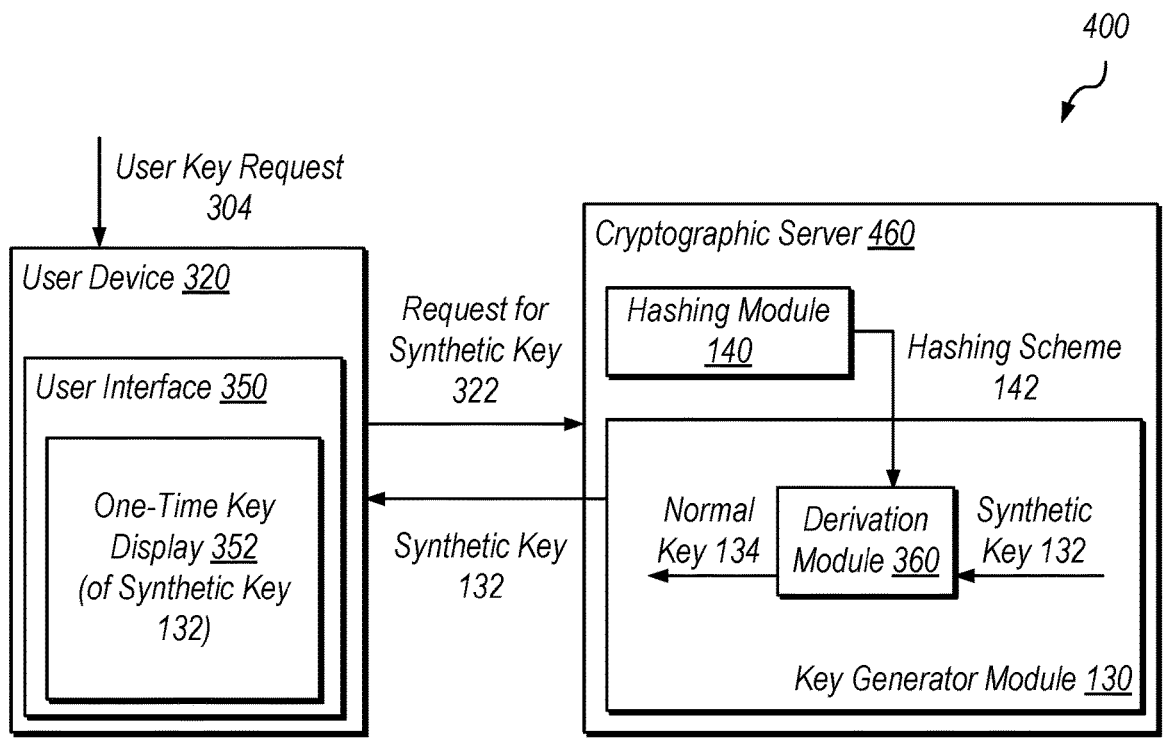
FIGS. 4A & 4B are block diagrams illustrating example generation of a synthetic key and use of the generated synthetic key, respectively, by a cryptographic server, according to some embodiments.
Figure 4B:
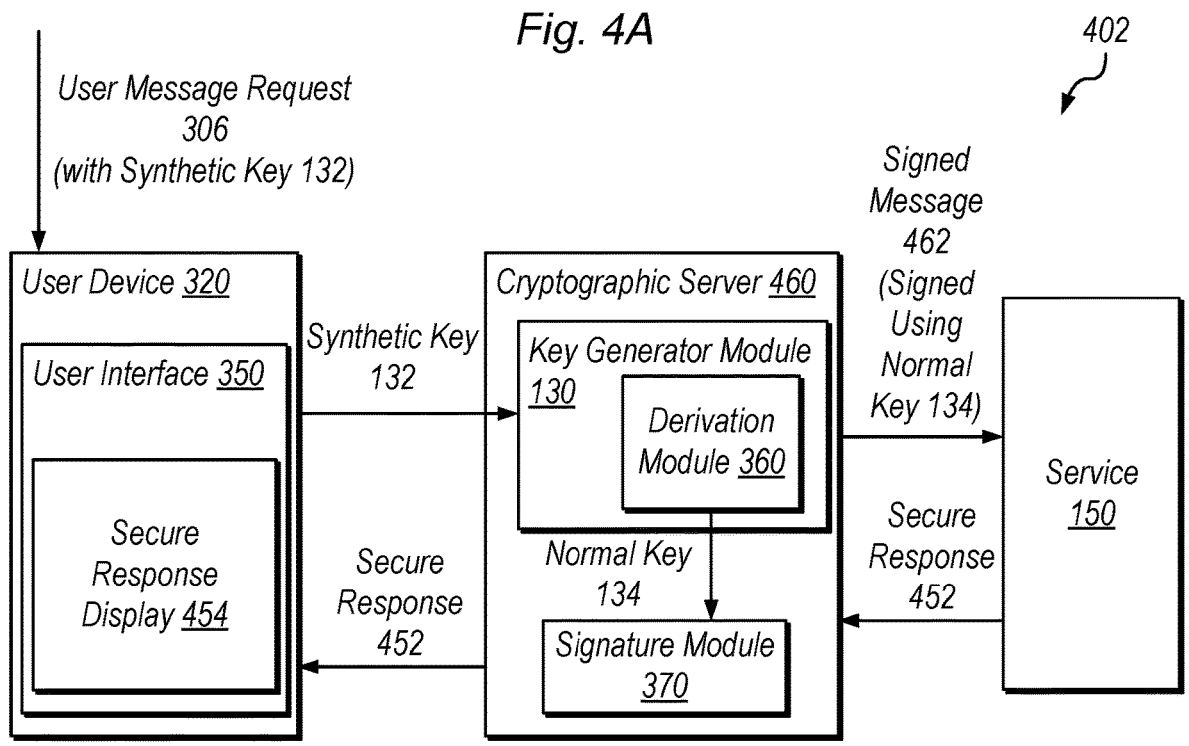

FIGS. 4A & 4B are block diagrams illustrating example generation of a synthetic key and use of the generated synthetic key, respectively. In FIG. 4A, system 400 includes a user device 320 and cryptographic server 460, while in FIG. 4B system 402 includes user device 320, cryptographic server 460, and service 150. Note that cryptographic server 460 is one example of computing system 110. Note that hashing scheme 140 is discussed in detail below with reference to FIG. 5.

Similar to FIG. 3A, FIG. 4A illustrates generation and display of synthetic key 132 in a one-time key display 352. Unlike FIG. 3A, however, in FIG. 4A, cryptographic server 460 is configured to generated synthetic key 132 rather than user device 320. In addition, in some embodiments, cryptographic server 460 is configured to register normal key 134 with service 150 after deriving normal key 134 from synthetic key 132 using hashing scheme 142. For example, cryptographic server 460 may provide a public key corresponding to normal (private) key 134 to a BITCOIN server in association with a particular user account. The BITCOIN server is then able to use this public key to verify that messages received from the particular user account have been signed using normal key 134.

In FIG. 4B, user device 320 provides synthetic key 132 to cryptographic server 460 in response to receiving user message request 306 which specifies synthetic key 132. Cryptographic server 460 executes derivation module 360 to derive normal key 134 from synthetic key 132. Cryptographic server 460 then signs the requested message and transmits the signed message 462 to service 150. In some embodiments, cryptographic server 460 transmits signed message 462 to user device 320 and user device provides this signed message directly to service 150 instead of communicating through server 460.

In FIG. 4B, service 150 provides secure response 452 to cryptographic server 460 and server 460, in turn, transmits the secure response 452 to user device 320. In embodiments where user device 320 provides signed message 462 directly to service 150, this service may transmit secure response 452 directly to user device 320 instead of communicating through server 460. User device 320 generates display 454 of the secure response 452 via user interface 350.

Example Hashing Module

Figure 5:
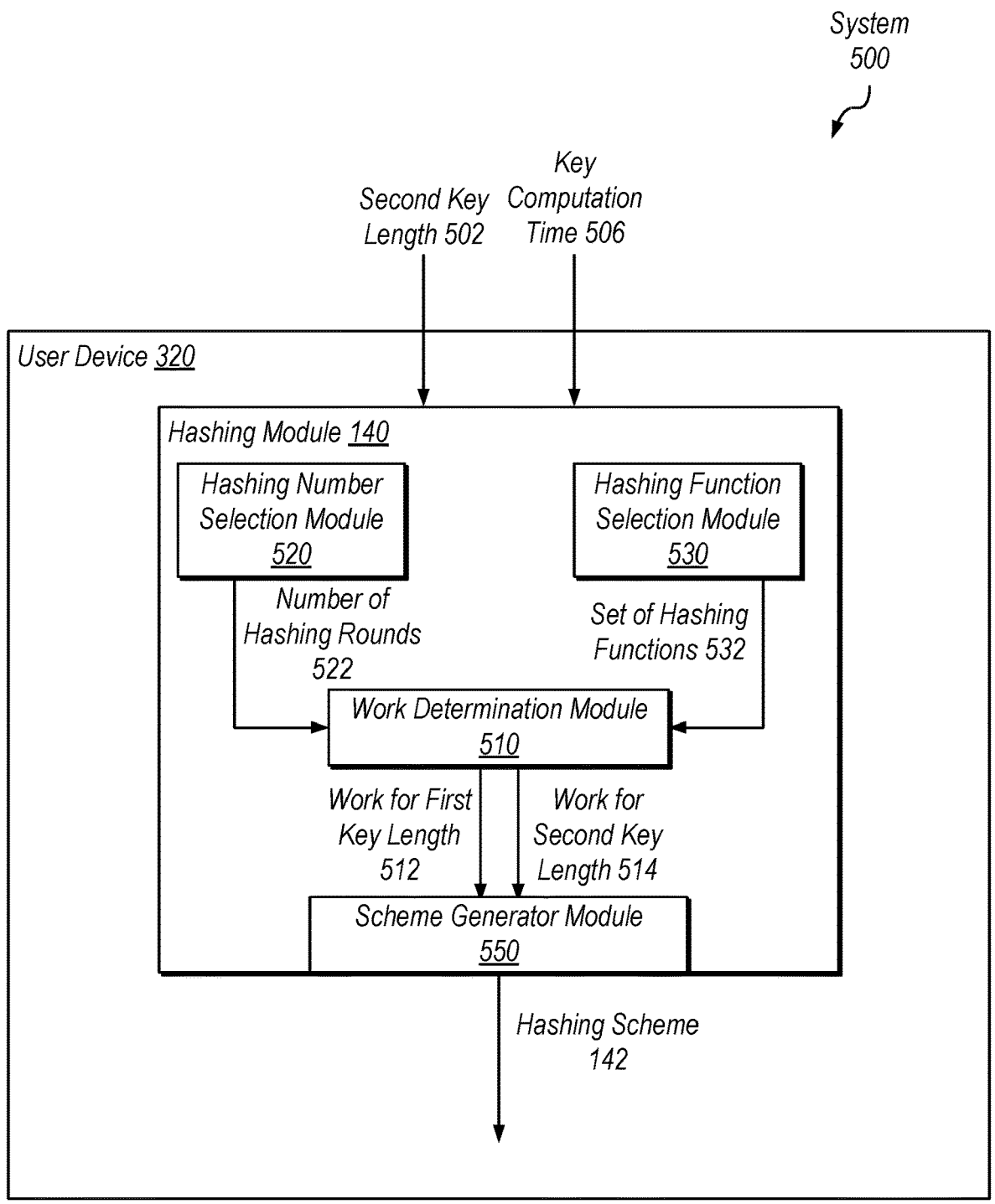
FIG. 5 is a block diagram illustrating an example hashing module, according to some embodiments.

FIG. 5 is a diagram illustrating a detailed example hashing module. In the illustrated embodiment, system 500 includes user device 320 which includes hashing module 140, which in turn includes work determination module 510, hashing number selection module 520, and hashing function selection module 530.

Hashing module 140, in the illustrated embodiment, receives a second key length 502 and a key computation time 506 from a user, generates hashing scheme 142 and provides hashing scheme 142 to derivation module 360 for deriving normal key 134. Hashing function selection module 530 selects one or more hashing functions based on second key length 502 and a key computation time 506. Module 530 then provides a set 532 of hashing functions to work determination module 510. For example, if the second key length is 10 characters and the key computation time 506 is 10 minutes, hashing function selection module 530 may select two different hashing functions to be included in set 532.

Hashing number selection module 520 selects a particular number of hashing rounds 522 based on second key length 502 and key computation time 506 and provides this number to work determination module 510. For example, for a key length of 10 characters and a key computation time of 10 minutes, hashing number selection module 520 may specify to perform 500,000 hashing rounds.

Work determination module 510 receives key computation time 506, second key length 502, set 532 of hashing functions, and number of hashing rounds 522. Work determination module 510 randomly generates a synthetic key of the second key length 502. Module 510 then calculates an amount of work 514 to perform the number of hashing rounds 522 on the synthetic key of the second key length 502 and to perform a brute-force determination of normal key resulting from hashing the synthetic key. For example, module 510 calculates the amount of work it will take to hash an 8-character key 100,000 times and then multiplies this amount by the number of permutations a 32-character normal key can have based on the number of characters in a normal field of 16 different characters (e.g., 0-9 and A-F) that the 9-character key maps to (this will only be 8 different characters). The result of this calculation is the amount of work 514 for the second key length.

Module 510 also determines an amount of work 512 to perform a brute-force determination of a normal key of a first length that is longer than the second length. For example, module 510 calculates the amount of work it will take to guess the total number of permutations that a 32-character normal key can have in a normal field of 16 different characters. That is, module 510 estimates how long it would take for an attacker to guess a user's normal key using two different techniques (1. brute-force guessing the longer normal key or 2. guessing the shorter synthetic key and deriving the normal key from this synthetic key using a hashing scheme). Module 510 provides amount of work 512 and 514 to scheme generator module 550.

Based on the amount of work 514 being equal to or greater than the amount of work 512, hashing scheme generator module 550 generates hashing scheme 142 that includes the number of hashing rounds 522 and the set 532 of hashing functions. If, however, amount of work 514 is less than amount of work 512, scheme generator module 550 may provide feedback to hashing number selection module 520 or hashing function selection module 530, or both, specifying to adjust the number of hashing rounds or the set 532 of hashing functions, or both. For example, if amount of work 514 is less than amount of work 512, scheme generator module 550 may tell hashing number selection module 520 to select a greater number of hashing rounds 522 for hashing a synthetic key.

Example User Interface

FIG. 6 is a block diagram illustrating example security options displayed via a user interface. In the illustrated embodiment, user interface 350 includes a plurality of security options 610A-N. Each of security options 610 include a security score 604, key length 602, and key computation time 606.

A user may send a request to user device 320 requesting a private key. In some embodiments, in response to such a request, user device 320 displays one or more security options (such as options 610). The user may then select one of the options displayed via user interface 350 (e.g., by clicking or taping a screen of their smart phone). Based on the user selection, user device 320 implements a particular security option when generating a synthetic private key. Specifically, user device provides the information specified in the selected security option (security score 604, key length 602, and key computation time 606) to hashing module 140. A user may select a security option by clicking (e.g., using a computer mouse) or taping (e.g., using their finger on a touch screen) a particular security option.

In the illustrated embodiment, the security scores 604 included in each security option 610 may specify a level of security associated with a synthetic key that is generated using the corresponding security option. For example, security option 610A has a security score 604A of 5 (out of 10), a key length 602A of 4 characters, and a key computation time 606A of 15 minutes, while security option 610B has a security score 604B of 7 (out of 10), a key length 602B of 4 characters, and a key computation time 606B of two hours. In this example, security option 610B is considered more secure because more hashing rounds may be performed for a 4-character key within two hours than within 15 minutes. That is, guessing a normal key corresponding to the synthetic key generated using security option 610A will take less work than guessing a normal key corresponding to the synthetic key generated using security option 610B.

In some embodiments, user interface 350 displays security options 610 in order of increasing security. For example, security options with higher scores are displayed in the right-hand portion of interface 350, while options with lower scores are displayed on the left-hand portion. In some embodiments, the key computation time for different user devices 320 may differ based on the hardware limitations of these devices. For example, with all else being equal (e.g., specified key length, number of hashing rounds, and types of hashing functions used), a user device with fewer hardware limitations may have a shorter key computation time (e.g., because this device is faster and more powerful) than a user device with more hardware limitations (e.g., because this device is slower).

Example Method

FIG. 7 is a flow diagram illustrating a method for generating a synthetic cryptographic private key for use with a service that uses a normal cryptographic private key that is longer in length than the synthetic key, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 710, in the illustrated embodiment, a computing system receives a request for a cryptographic private key for use with a service that uses a key of a first length, wherein the request specifies a key of a second length that is less than the first length. In some embodiments, the service accepts messages that have been signed using a key of the first length.

At 720, the computing system generates, in response to the request, a hashing scheme, wherein the hashing scheme is generated based on the second length and a key computation time. In some embodiments, the generated hashing scheme includes: a determined number of hashing rounds and a selected set of hashing functions. In some embodiments, the selected set of hashing functions includes one or more of the following: a scrypt function, a BLAKE function, and a SHA function. In some embodiments, the key computation time specifies, based on hardware limitations of the computing system, an amount of time to generate the normal key using the hashing scheme. In some embodiments, the key computation time is specified by a user and is included in the received request for a cryptographic private key.

In some embodiments, generating the hashing scheme includes displaying, via the user device, a set of security options, where at least one of the security options in the set of security options specifies a security score, a key length, and a key computation time. In some embodiments, the displayed security options are generated based on a length of time (a key computation time) a user is willing to wait for their synthetic key to be generated. In some embodiments, generating the hashing scheme includes receiving, based on user clicking activity, information specifying a security option, included in the set of security options, selected by the user.

In some embodiments, generating the hashing scheme includes selecting a particular number of hashing rounds. In some embodiments, generating the hashing scheme includes calculating a first amount of work to complete the particular number of hashing rounds for a key of the second length and to perform a brute-force determination of a key of the second length. In some embodiments, generating the hashing scheme includes calculating a second amount of work to perform a brute-force determination of a cryptographic private key of the first length. In some embodiments, generating the hashing scheme includes comparing the first amount of work and the second amount of work. In some embodiments, generating the hashing scheme further includes selecting, based on the comparing, a particular number of hashing rounds for the hashing scheme such that a first expected amount of work associated with a brute-force determination of a key of the second length and an associated hashing scheme exceeds a second expected amount of work associated with a brute-force determination of a key of the first length.

At 730, the computing system creates a synthetic key of the second length. In some embodiments, the computing system generates the synthetic key by randomly selecting 8 characters from a set of 16 letters and numbers. In some embodiments, the synthetic key is a length that is rememberable by a user.

At 740, the computing system uses the synthetic key and the hashing scheme to create a normal key of the first length. In some embodiments, the synthetic key permits a user to access the service by supplying the synthetic key and without having to supply the normal key. In some embodiments, in response to the request, the computing system transmits the synthetic key to a cryptographic application downloaded on a user device. In some embodiments, the computing system is a cryptographic server that facilitates communication between the cryptographic application and the service.

In some embodiments, the transmitting causes display of the synthetic key via a user interface of the user device in a one-time display for memorization by a user of the user device. In some embodiments, the user interface is included in a user device and the computing device is a cryptographic server that facilitates communication between a cryptographic application downloaded on the user device and the service. In some embodiments, the computing system receives, from a user, a request to send a private message to the service, wherein the request includes a synthetic key. In some embodiments, the computing system derives, based on the received synthetic key, a normal key, where the deriving is performed using the hashing scheme. In some embodiments, the computing system stores the synthetic key on a hardware device. For example, the synthetic key may be locked in a safe while daily transactions may be performed using a memorized synthetic key.

In some embodiments, the computing system signs a message using the result of the deriving. In some embodiments, the computing system transmits the signed message to the service. In some embodiments, the computing system receives, based on the signed message being authenticated by the service, a confirmation message for the requested message. In some embodiments, the user requests to perform a transaction via the service.

Example Computing Device

Figure 8:
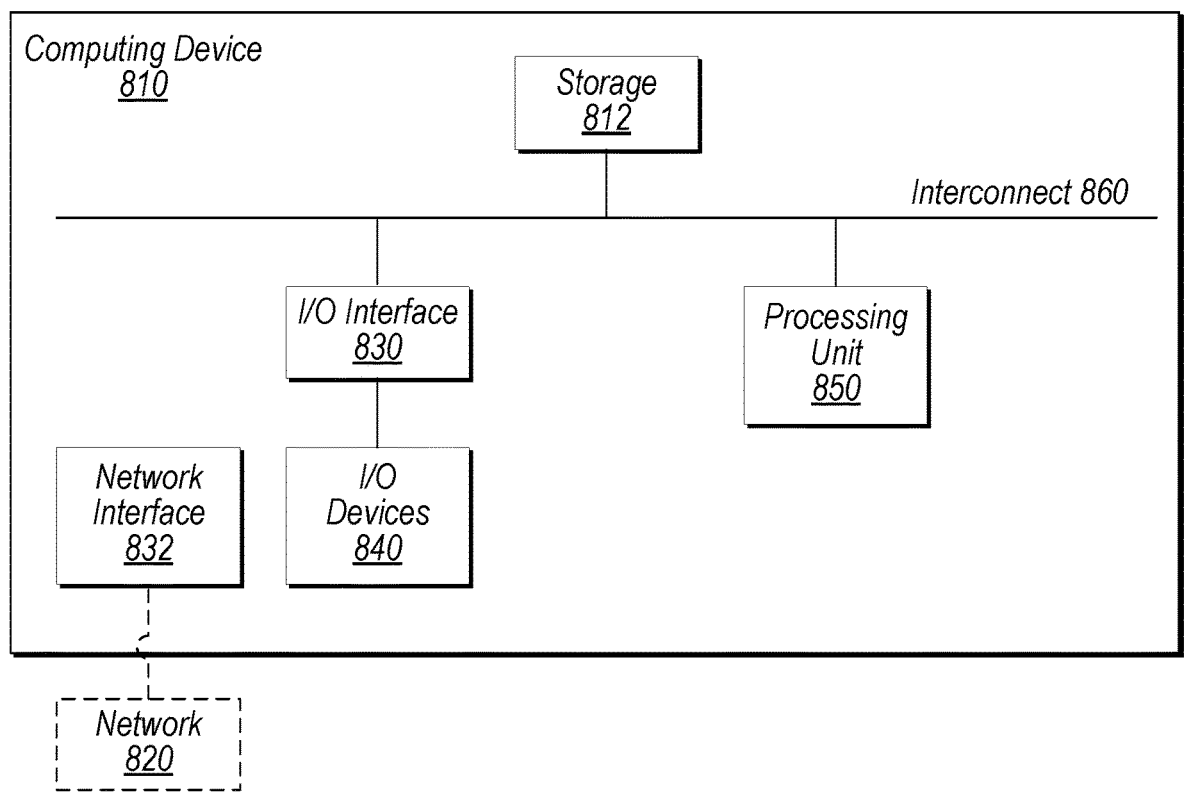
FIG. 8 is a block diagram illustrating an example computing device, according to some embodiments.

Turning now to FIG. 8, a block diagram of one embodiment of computing device (which may also be referred to as a computing system) 810 is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. As shown, computing device 810 includes processing unit 850, storage 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 812 may consist solely of volatile memory, in one embodiment. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, by a computing system, a request for a cryptographic private key for use with a service that uses a key of a first length, wherein the request specifies a key of a second length that is less than the first length;
   generating, by the computing system in response to the request, a hashing scheme, wherein the hashing scheme is generated based on the second length and a key computation time, and wherein generating the hashing scheme includes:
   selecting a particular number of hashing rounds, wherein the particular number of hashing rounds is selected for the generated hashing scheme by comparing a first expected amount of work associated with a brute-force determination of the key of the second length and a second expected amount of work associated with a brute-force determination of the key of the first length; and
   selecting a set of hashing functions;
   creating, by the computing system, a synthetic key of the second length; and using, by the computing system, the synthetic key and the generated hashing scheme to create a normal key of the first length;

wherein the synthetic key permits a user to access the service by supplying the synthetic key and without having to supply the normal key.

2. The method of claim 1, further comprising:

in response to the request, transmitting, by the computing system, the synthetic key to a cryptographic application downloaded on a user device;

wherein the computing system is a cryptographic server that facilitates communication between the cryptographic application and the service.

3. The method of claim 2, wherein the transmitting causes display of the synthetic key via a user interface of the user device in a one-time display for memorization by a user of the user device.

4. The method of claim 2, wherein generating the hashing scheme includes:

displaying, via the user device, a set of security options, wherein at least one of the security options in the set of security options specifies a security score, a key length, and a key computation time; and receiving, based on user clicking activity, information specifying a security option, included in the set of security options, selected by the user.

5. The method of claim 4, wherein the displayed security options are displayed in order of increasing security within a user interface of the user device.

6. The method of claim 1, further comprising:

receiving, by the computing system from a user, a request to send a private message to the service, wherein the request includes a synthetic key;

deriving, by the computing system based on the received synthetic key, a normal key, wherein the deriving is performed using the generated hashing scheme;

signing, by the computing system using a result of the deriving, a message; and transmitting, by the computing system to the service, the signed message.

7. The method of claim 1, wherein selecting the particular number of hashing rounds further includes:

calculating a first amount of work to complete the particular number of hashing rounds for a key of the second length and to perform a brute-force determination of a key of the second length;

calculating a second amount of work to perform a brute-force determination of a cryptographic private key of the first length; and comparing the first amount of work and the second amount of work.

8. The method of claim 1, wherein the key computation time specifies, based on hardware limitations of the computing system, an amount of time to generate the normal key using the generated hashing scheme.

9. The method of claim 1, wherein the key computation time is specified by a user and is included in the received request for a cryptographic private key.

10. The method of claim 1, wherein the selected set of hashing functions includes one or more of the following: a scrypt function, a BLAKE function, and a SHA function.

11. A non-transitory computer-readable medium having instructions stored thereon that are executable by a computing device to perform operations comprising:

receiving a request for a cryptographic private key for use with a service that uses a key of a first length, wherein the request specifies a key of a second length that is less than the first length;

generating, in response to the request, a hashing scheme, wherein the hashing scheme is generated based on the second length and a key computation time, and wherein generating the hashing scheme includes:

selecting a particular number of hashing rounds, wherein the particular number of hashing rounds is selected for the generated hashing scheme by comparing a first expected amount of work associated with a brute-force determination of the key of the second length and a second expected amount of work associated with a brute-force determination of the key of the first length; and selecting a set of hashing functions;

creating a synthetic key of the second length; and using the synthetic key and the generated hashing scheme to create a normal key of the first length, wherein the synthetic key permits a user to access the service by supplying the synthetic key and without having to supply the normal key; and causing display of the synthetic key via a user interface in a one-time display for memorization by a user associated with the request.

12. The non-transitory computer-readable medium of claim 11, wherein the user interface is included in a user device and wherein the computing device is a cryptographic server that facilitates communication between a cryptographic application downloaded on the user device and the service.

13. The non-transitory computer-readable medium of claim 12, wherein generating the hashing scheme includes:

receiving, from a user of the user device, information specifying the key computation time;

displaying, via the user device based on the key computation time, a set of security options, wherein at least one of the security options in the set of security options specifies a security score, and a key length; and receiving, based on user clicking activity, information specifying a security option, included in the set of security options, selected by the user.

14. The non-transitory computer-readable medium of claim 11, further comprising:

receiving, from a user, a request to perform a transaction via the service, wherein the request includes a synthetic key;

deriving, based on the received synthetic key, a normal key, wherein the deriving is performed using the generated hashing scheme;

signing, using a result of the deriving, a transaction; and transmitting, to the service, the signed transaction.

15. The non-transitory computer-readable medium of claim 11, wherein selecting the particular number of hashing rounds further includes:

calculating a first amount of work to complete the particular number of hashing rounds for a key of the second length and to perform a brute-force determination of a key of the second length;

calculating a second amount of work to perform a brute-force determination of a cryptographic private key of the first length; and comparing the first amount of work and the second amount of work.

16. A non-transitory computer-readable medium having instructions stored thereon that are executable by a computing device to perform operations comprising:

receiving, from a user, a request to transmit a message to a service that uses a key of a first length, wherein the request includes a synthetic cryptographic private key of a second length that is less than the first length and is usable in communicating secure messages;

deriving, based on the synthetic cryptographic private key, a normal cryptographic private key of the first length, wherein the deriving is performed using a hashing scheme, wherein the hashing scheme is generated based on the second length and a key computation time, and wherein generating the hashing scheme includes:

selecting a particular number of hashing rounds, wherein the particular number of hashing rounds is selected for the generated hashing scheme by comparing a first expected amount of work associated with a brute-force determination of the key of the second length and a second expected amount of work associated with a brute-force determination of the key of the first length; and selecting a set of hashing functions;

signing, using the normal cryptographic private key, the requested message; and transmitting, to the service, the signed message.

17. The non-transitory computer-readable medium of claim 16, wherein the operations further comprise:

receiving, based on the signed message being authenticated by the service, a confirmation message for the requested message.

18. The non-transitory computer-readable medium of claim 16, wherein the operations further comprise, prior to the receiving:

creating the synthetic cryptographic private key of the second length; and using the synthetic cryptographic private key and the generated hashing scheme to create the normal cryptographic private key of the first length.

19. The non-transitory computer-readable medium of claim 18, wherein the operations further comprise:

in response to the request for a cryptographic private key, causing display of the synthetic cryptographic private key in a one-time display via a user device;

wherein the computing device is a cryptographic server that facilitates communication between a cryptographic application downloaded on the user device and the service.

20. The non-transitory computer-readable medium of claim 16, wherein selecting the particular number of hashing rounds further includes:

calculating a first amount of work to complete the particular number of hashing rounds for a key of the second length and to perform a brute-force determination of the key of the second length;

calculating a second amount of work to perform a brute-force determination of a key of the first length; and comparing the first amount of work and the second amount of work.

* * * * *